(12) United States Patent
Balachandran et al.

(10) Patent No.: US 8,081,609 B2
(45) Date of Patent: Dec. 20, 2011

(54) PROXY-BASED SIGNALING ARCHITECTURE FOR STREAMING MEDIA SERVICES IN A WIRELESS COMMUNICATION SYSTEM

(75) Inventors: Krishna Balachandran, Morganville, NJ (US); Doru Calin, Manalapan, NJ (US); Eunyoung Kim, Parlin, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 888 days.

(21) Appl. No.: 11/674,858

(22) Filed: Feb. 14, 2007

(65) Prior Publication Data

US 2008/0192711 A1 Aug. 14, 2008

(51) Int. Cl.
*H04W 4/00* (2009.01)
(52) U.S. Cl. ........ 370/338; 370/401; 370/339; 370/241; 455/9; 709/203; 725/114
(58) Field of Classification Search .................. 370/338, 370/201, 401; 455/9; 709/203; 725/114
See application file for complete search history.

(56) References Cited

U.S. PATENT DOCUMENTS

| 7,007,062 B1 * | 2/2006 | Serenyi et al. ................ 709/203 |
| 2003/0198184 A1 | 10/2003 | Huang et al. .................. 370/231 |
| 2004/0098748 A1 | 5/2004 | Bo et al. ........................ 725/105 |
| 2004/0240390 A1 | 12/2004 | Seckin ........................... 370/252 |
| 2008/0137541 A1 * | 6/2008 | Agarwal et al. ............... 370/241 |
| 2010/0323739 A1 * | 12/2010 | Wan et al. ..................... 455/513 |

FOREIGN PATENT DOCUMENTS

| GB | 1 209 838 A1 | 5/2001 |
| GB | 1 610 520 A1 | 6/2004 |
| WO | WO 2004091151 A1 * | 10/2004 |

OTHER PUBLICATIONS

International Search Report and Written Opinion mailed Jul. 9, 2008.
ETSI TS 126 234 V6.10.0 (Dec. 2006) *Universal Mobile Telecommunications System (UMTS); Transparent end-to-end Packet-switched Streaming Service (PSS); Protocols and Codecs* (3GPP TS 26.234 version 6.10.0 Release 6).

\* cited by examiner

*Primary Examiner* — Dwayne Bost
*Assistant Examiner* — Amancio Gonzalez
(74) *Attorney, Agent, or Firm* — Williams, Morgan & Amerson, P.C.

(57) ABSTRACT

The present invention provides a method involving a media server, a wireless access network, at least one media client, and a proxy server. The method includes accessing, at the proxy server, at least one message including information indicating impending establishment of a media session between the media server and said at least one media client. The method also includes providing, from the proxy server, information indicating the impending establishment of the media session and a request to receive feedback associated with the media session. The method further includes receiving, at the proxy server, feedback associated with the media session in response to providing the request to receive feedback associated with the media session.

20 Claims, 3 Drawing Sheets

PROXY-BASED SIGNALING ARCHITECTURE FOR STREAMING MEDIA SERVICES IN A WIRELESS COMMUNICATION SYSTEM

CROSS REFERENCE TO RELATED APPLICATIONS

This application is related to U.S. patent application Ser. Nos. 11/674,802 and 11/674,842, filed concurrently herewith and incorporated herein by reference in their entirety.

BACKGROUND OF THE INVENTION

1. Field of the Invention

This invention relates generally to communication systems, and, more particularly, to wireless communication systems.

2. Description of the Related Art

Streaming media services (e.g. music, video) over wireless communication networks have been gaining in popularity, and are likely to become commercially important to wireless service providers in the near future. A major impediment to their success is the often poor and/or unreliable audio or video quality associated with these services. Packets transmitted through the wireless communication network may be lost, delayed, or experience jitter. For example, signal strength fluctuations due to environmental changes and the need to share the wireless access medium among multiple users lead to significant fluctuations in the rate at which packets carrying a media stream are delivered to mobile units and/or the applications running on the mobile unit such as a media player. Packets may also be lost as they traverse the air interface from the media server to the client, which may cause interruptions in the media service and/or degraded quality of the media service. Conventional media sessions attempt to reduce the effects of lost packets, delayed packets, and/or jitter by buffering the received data stream.

Figure 1:
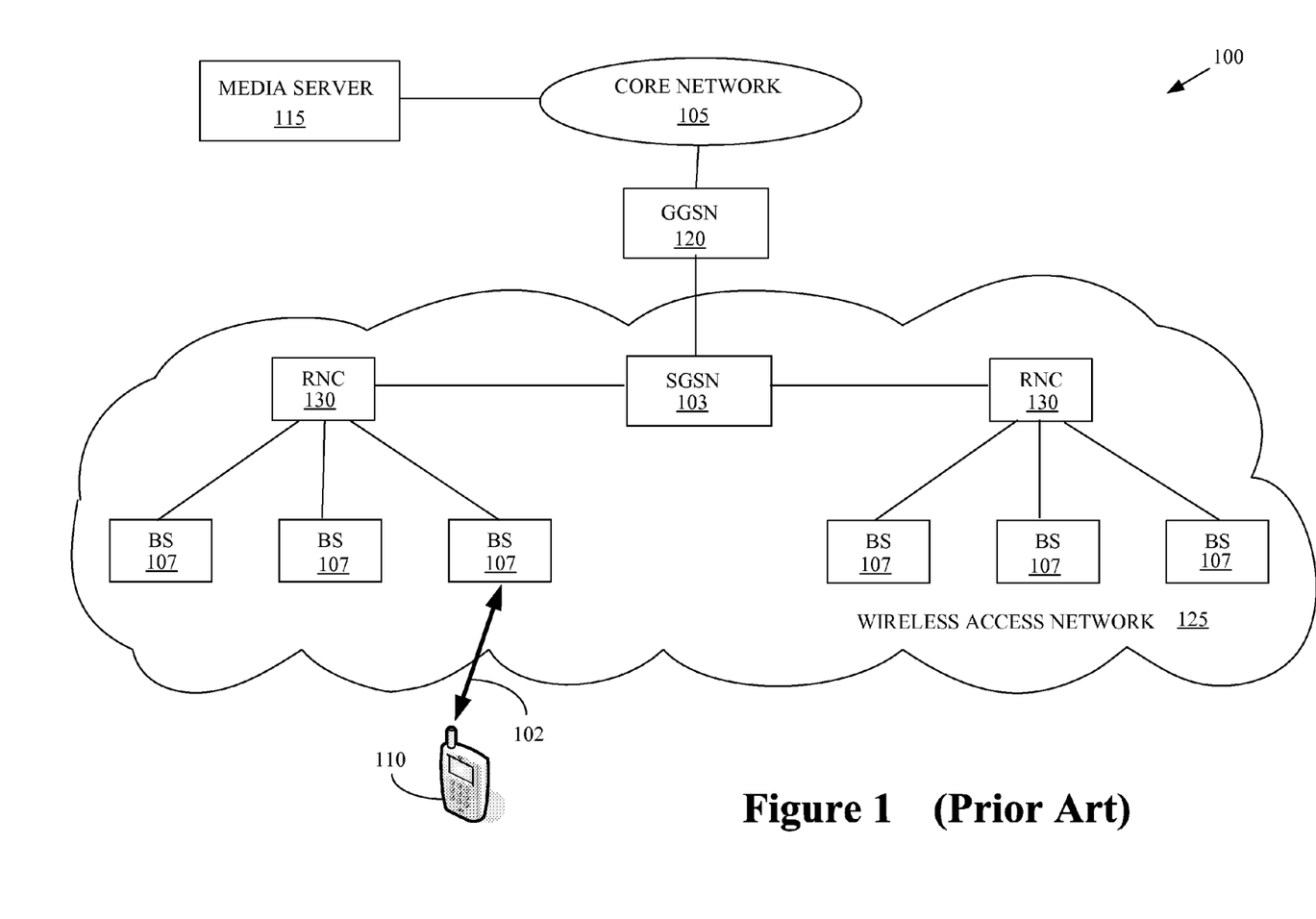
FIG. 1 conceptually illustrates one exemplary embodiment of a conventional system for streaming media over a wireless network.

FIG. 1 conceptually illustrates one exemplary embodiment of a conventional system 100 for streaming media over a wireless network. The radio links 102 between the base stations 107 and mobile clients 110 constitute the only wireless segment of the system 100. Although the system 100 as a whole comprises wired as well as wireless segments, it is conventionally referred to as a wireless network 100. A core network 105 lies between the Gateway GPRS Support Node (GGSN) 120 and the media server 115. The network segment between the GGSN 120 and the mobile client 110 (which typically includes GGSN 120 and mobile client 110) is conventionally referred to as the wireless access network 125. In the illustrated embodiment, the wireless access network 125 is based on the Universal Mobile Telecommunications System (UMTS) (3GPP) standard. However, the wireless access network 125 may also operate according to other wireless networking technologies and standards, e.g., cdma2000 High Rate Packet Data (HRPD) or IEEE 802.16e/WiMAX. In the case of cdma2000 HRPD, for instance, system 100 would appear identical to that in FIG. 1, except that the node pair, Serving GPRS Support Node (SGSN) 103 and Gateway GPRS Support Node (GGSN) 120, is replaced by a single entity known as the Packet Data Serving Node (PDSN). Furthermore, although a hierarchical architecture is illustrated, the wireless network 100 may also implement flat or distributed Internet Protocol (flat-IP) based architectures where Layer 3 routing (i.e., IP routing) and control functions relating to the wireless access network 125 are performed by a base station router that merges the base-station 107, radio network controller (RNC) 130, SGSN 103 and GGSN 120 into a single entity.

In the illustrated embodiment, a mobile client 110 may initiate a streaming video session with a media server 115 over the wireless network 100. For example, the client 110 may request a streaming video session by sending an RTSP message to the server 115. To initiate a media session, the mobile client 110 exchanges signaling messages with the media server 115 to establish a streaming media session and negotiate session parameters, e.g. the bit-rate at which the media is to be streamed. The mobile client 110 also exchanges lower-layer signaling messages with the RNC 130, the SGSN 103, and the GGSN 120 to establish a radio access bearer channel. The radio access bearer channels are typically configured to maintain desired Quality-of-Service (QoS) characteristics, e.g. if best-effort bearer service is deemed inadequate. Once the radio access bearer channel is established and the streaming media session is set up, the media server 115 transmits packets carrying the media to the mobile client 110, via the GGSN 120, the SGSN 103, the RNC 130, and the base station 107. The mobile client 110 sends periodic feedback messages along the reverse path from the base station 107 to the RNC 130, SGSN 103, GGSN 120, and media server 115. Owing to uplink bandwidth limitations in wireless access networks, the uplink feedback messages are transmitted relatively infrequently, e.g. once every 3-4 seconds.

Packets carrying the media and feedback messages transmitted by the mobile client 110 are carried transparently by the network elements. Thus, the signaling (in the form of feedback messages from the mobile client 110) that helps the media server 115 make control decisions (such as changing transmission rate or content rate) is essentially end-to-end, with no intervention by the network elements. The media server 115 may also transmit some control/signaling messages to the mobile client 110 on a periodic basis. These messages, such as "server reports" are also carried transparently by the network elements. The media server's control decisions are therefore based on the rather infrequent feedback received from the mobile client 110, which does not have direct knowledge of the channel conditions. Consequently, the media server 115 cannot make timely decisions to avoid packet losses or prevent rebuffering events that are detrimental to the quality of the streaming media service.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving a media server, a wireless access network, at least one media client, and a proxy server. The method includes accessing, at the proxy server, at least one message including information indicating impending establishment of a media session between the media server and said at least one media client. The method also includes providing, from the proxy server, information indicating the impending establishment of the media session and a request to receive feedback associated with the media session. The method further includes receiving, at the proxy server, feedback associated with the media session in response to providing the request to receive feedback associated with the media session.

In another embodiment of the present invention, a method is provided involving a media server, a wireless access network, at least one media client, and a proxy server. The method includes receiving, from the proxy server, information indicating the impending establishment of the media session and a request to receive feedback associated with the media session. The information and the request are provided in response to the proxy server receiving at least one message including information indicating impending establishment of a media session between the media server and said at least one media client. The method also includes providing, to the proxy server, feedback associated with the media session in response to receiving the request to receive feedback associated with the media session.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
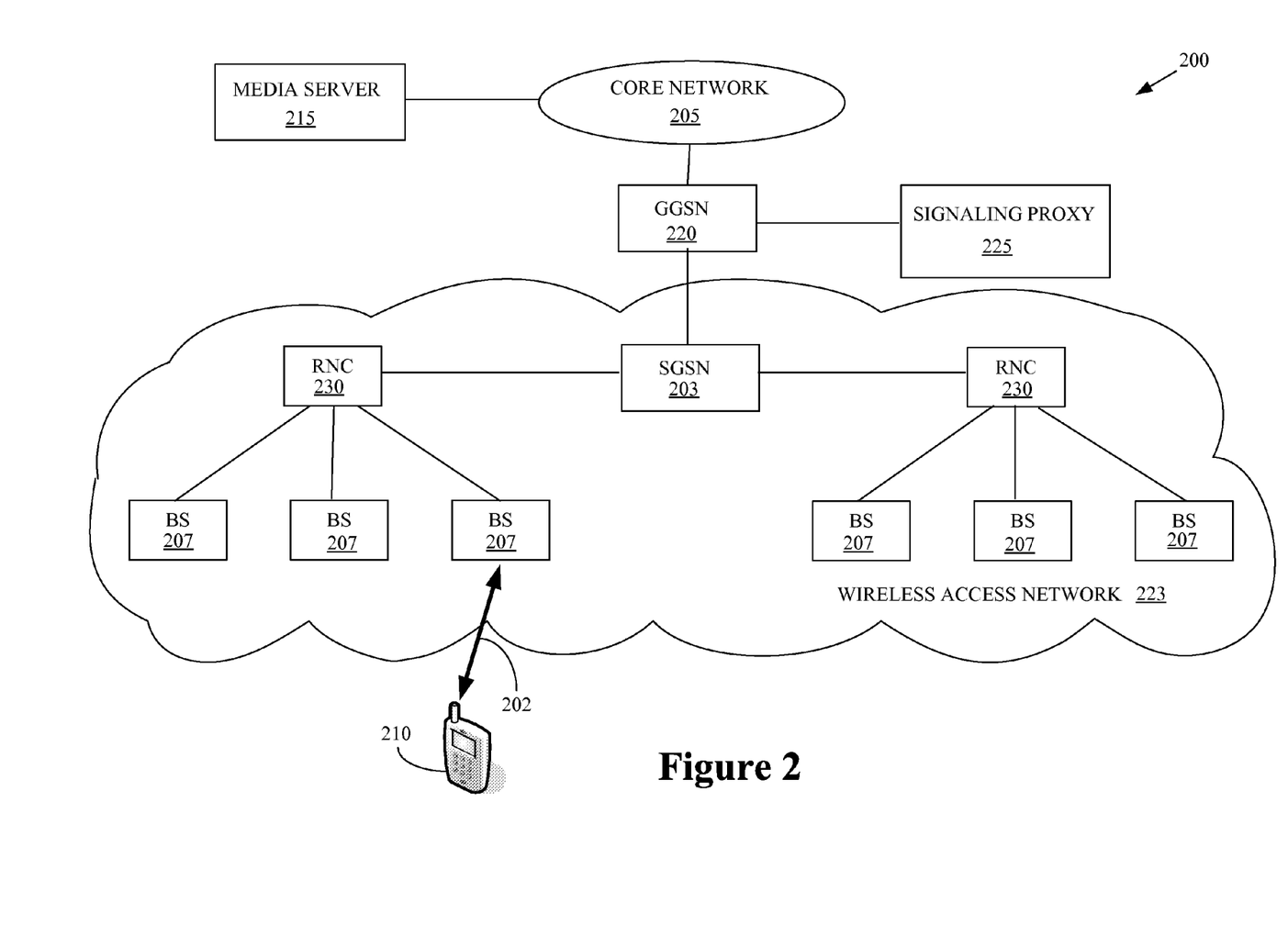
FIG. 2 conceptually illustrates one exemplary embodiment of a system for streaming media over a wireless network, in accordance with the present invention.

FIG. 2 conceptually illustrates one exemplary embodiment of a system 200 for streaming media over a wireless network 200. In the illustrated embodiment, the portion of the system 200 between the media server 215 and mobile client 210 is conventionally referred to as a wireless network 200 even though it may include wireless as well as wired segments. The network segment between GGSN 220 and mobile client 210 will be referred to as the wireless access network 223. In the illustrated embodiment, the wireless network 200 includes one or more base stations 207 that may be used to stream media over an air interface 202 to one or more clients 210, such as mobile units. The media may be provided by a media server 215 via a Gateway GPRS Support Node (GGSN) 220, a Serving GPRS Support Node (SGSN) 203, and a radio network controller (RNC) 230. The wireless access network 223, comprising the base stations 207, the SGSN 203, the GGSN 220, and the RNC 230 may operate according to the Universal Mobile Telecommunication System (UMTS) (3GPP) standards and/or standard protocols for real-time media transport. For example, in streaming media sessions, the Real-time Transport Protocol (RTP) may be used to carry the media content and the associated Real Time Control Protocol (RTCP) may be used to carry the associated control packets. A third protocol, the Real Time Streaming Protocol (RTSP), may be used for the transmission of messages for session setup (including capability exchange), teardown, and some user actions (e.g. pause, fast-forward, etc.). Details regarding RTP/RTCP and RTSP can be found in the Internet Engineering Task Force Requests for Comments (IETF RFCs) 1889 and 2326, respectively.

However, persons of ordinary skill in the art having benefit of the present disclosure should appreciate that the first exemplary embodiment is intended to be illustrative and that the present invention is not limited to these standards and/or protocols. For example, the techniques described herein may also be applied to any other wireless networking technology and standards, e.g., cdma2000 High Rate Packet Data (HRPD) or IEEE 802.16e/WiMAX. In the case of cdma2000 HRPD, for instance, system 200 would appear identical to that in FIG. 2, except that the node pair, Serving GPRS Support Node (SGSN) 203 and the Gateway GPRS Support Node (GGSN) 220, would be replaced by a single entity known as the Packet Data Serving Node (PDSN). Furthermore, although a hierarchical architecture is illustrated, the techniques described herein may also be applied to flat-Internet Protocol (flat-IP) based architectures where Layer 3 routing (i.e., IP) and control functions relating to the wireless access network are performed by the base station.

The client 210 may support standard RTSP/RTCP signaling with or without 3GPP extensions for transparent end-to-end packet-switched streaming services. Thus, the client 210 may periodically send RTCP (feedback) packets towards the media server 215 to apprise the media server 215 of performance metrics such as: fraction of packets lost (since the last similar report), cumulative number of packets lost, highest (RTP) sequence number received, RTP timestamp associated with the last sender's report (received from the server), time since receiving the last sender's report, RTP sequence number associated with the next application data unit to be decoded, the delay until the decoding of the next application data unit, free buffer space (at the client), and the like. Note that the last three of this list of items are in accordance with the 3GPP extensions for packet-switched streaming services whereas the rest are standard feedback items included in RTCP receiver reports. Other than these items included in the receiver reports, each RTCP packet may also carry a timestamp that can be used by the server to relate the report to a specific point in time. The client 210 may send the RTCP feedback packets at a rate consistent with its own capability and the capacity of the wireless uplink. Typically, such feedback packets are sent rather infrequently, e.g. once every 3 to 4 seconds. The interval at which the client device sends its RTCP feedback will be denoted by $T_R$.

The wireless communication system 200 includes a signaling proxy 225. In one embodiment, the signaling proxy 225 may be attached to a wireless access network entity in the wireless network 200, such as the Gateway GPRS Support Node (GGSN) 220. However, in other embodiments of the invention it is possible to attach the signaling proxy 225 to other access network entities such as the Serving GPRS Support Node (SGSN) 203, the Radio Network Controller (RNC) 230, or, in the case of an access network comprising base-station routers that are characterized by a flat architecture (e.g. multiple functionalities handled by RNC, SGSN and GGSN collapsed into only one entity, the base-station router), to the base-stations themselves. The signaling proxy 225 may be implemented in software, firmware, hardware, or any combination thereof.

The signaling proxy 225 receives feedback from the client 210. In one embodiment, the feedback from the client 210 is indicative of the current session state of the client 210. For example, the signaling proxy 225 may intervene in the flow of RTCP and RTSP messages. During session setup and teardown as well as during the lifetime of a session, control messages (e.g., RTCP and RTSP messages associated with the media session) generated by the client 210, which would normally go directly to the media server 215 are, instead, provided to the signaling proxy 225. These messages may help the signaling proxy 225 keep track of user actions as well as the state of the client 210 (e.g. buffer contents, expected time for overflow/underflow, etc.). In one embodiment, the RTP packets carrying the media content may flow directly from the media server 215 to the client 210.

The signaling proxy 225 also receives feedback from the wireless access network 223. In one embodiment, the feedback from the wireless access network 223 is indicative of resources associated with an air interface between the wireless access network 223 and the client 210. For example, the signaling proxy 225 may receive frequent feedback in the form of RAN-Proxy Control Packets from the sending Radio Link Control Protocol handler, which may be implemented without loss of generality at the Radio Network Controller 230. In the case of a wireless access network 223 with base-station routers, the signaling proxy 225 may be attached to these routers and the information concerning buffer levels, available bandwidth, number of competing users, etc. will be locally available. The feedback apprises the signaling proxy 225 of the detailed system information and system view available from entities in the wireless access network 223, such as buffer levels at the RNC 230, the number of users sharing the downlink bandwidth with the media session, the bandwidth available to each user, and the like. For each media stream, the channel/network condition feedback (sent by the corresponding RNC 230) may also include the maximum transmission rate at which the media stream can be transmitted under the current conditions. It is also possible to (optionally) report other measurements such as the number of packets carrying the streaming media delivered to the client 210 during the last reporting interval Information transmitted in the downlink signaling/control messages (e.g., the signaling/control messages transmitted by the media server 215) may be recorded at the signaling proxy 225 to keep track of the server actions and the capabilities negotiated between the client 210 and the server 215. In one embodiment, the signaling proxy 225 may pass these messages essentially unchanged to the client 210. Instead of being provided directly to the media server 215, uplink signaling/control messages transmitted by the client 210 may be intercepted by the signaling proxy 225, which may record the information contained in these messages to keep track of the client state. The signaling proxy 225 may use this knowledge of the client state in combination with the periodic channel/network condition feedback received from the relevant network element to generate feedback messages, which may be sent to the media server 215. The feedback messages formed by the signaling proxy 225 may include the information that was contained in the original feedback messages transmitted by the client 210 (and intercepted by the proxy 225), as well as other useful parameters (such as the maximum transmission rate for the streaming media session) that may be determined based on the actual network conditions that are visible to the corresponding network elements (such as the RNC 230). The bandwidth limitations between the signaling proxy 225 and the media server 215 do not typically constrain the frequency of feedback messages transmitted between the signaling proxy 225 and the media server 215, and so the signaling proxy 225 can send its feedback messages at fairly short intervals (e.g. 100 ms). The reduced feedback interval may help the media server 215 make more accurate and timely control decisions, relative to conventional systems that do not include a signaling proxy 225, thus enhancing the overall quality of the streaming media service.

In operation, the mobile client 210 may initiate a streaming video session with the media server 215 over the wireless network 200. For example, the client 210 may request a streaming video session by sending an RTSP message to the server 215. The GGSN 220 forwards the RTSP message to the signaling proxy 225 instead of the media server 215. The proxy 225 inspects this message, realizes that it could be the beginning of a new streaming video session, and makes an entry into its local cache. It then forwards the message to the server 215. The proxy 225 also sends a session establishment indication message to the RNC 230 through which the RTSP message passed on its way toward the GGSN 220. The session establishment indication message informs the RNC 230 of the impending establishment of the session. If a radio access bearer (RAB) has already been set up for the session, the RNC 230 responds (to the proxy 225) with a RAB establishment message; otherwise, the RNC 230 merely sends an acknowledgement.

The server 215 responds to the message and subsequent RTSP messages are exchanged by the client 210 and the server 215 to carry out a capability exchange. The subsequent RTSP messages are also routed via the signaling proxy 225. This enables the proxy 225 to discover the relevant capabilities indicated by one or more session parameters (e.g. bandwidth, buffer size, etc.) agreed upon by the client 210 and the server 215. If the capability exchange includes the rate or time interval at which the client 210 is to send its receiver report to the server 215, the proxy 225 modifies this parameter as it forwards the corresponding message to the server 215 so that the server 215 is prepared to receive feedback at the appropriate time interval or rate as determined by the proxy. In addition to regular reporting intervals, note that under certain conditions (e.g. changes in the session's maximum transmission rate or buffer status at the RNC 230), the proxy 225 may also choose to autonomously send feedback reports to the server 215. The modification enables the proxy 225 to send reports to the server 215 at a much higher rate (consistent with the abundant bandwidth available between the proxy 225 and the server 215) while allowing the client 210 to send its reports (which are intercepted by the proxy 225) at a lower rate.

After the capability exchange with the server 215, the client 210 initiates the establishment of a Packet Data Protocol (PDP) context and a Radio Access Bearer (RAB) to carry the streaming media session with the desired Quality of Service over the downlink. When the RAB and the corresponding Radio Bearer (RB) have been set up, the radio network controller (RNC) 230 informs the signaling proxy 225 about the event. If the proxy 225 already has an entry in its cache for a corresponding streaming video session, it responds with a positive indication, instructing the RNC 230 to send periodic feedback (to the proxy 225) about the session's maximum transmission rate, buffer occupancy and the like. At a minimum, this feedback should include the maximum transmission rate for the session; the other parameters are optional. If the proxy 225 does not have an entry in its cache for the streaming media session, it responds with a negative indication. Such a scenario could take place when a RAB is established to carry a streaming media session before the client 210 begins signaling with the media server 215 for session establishment. Note that in this scenario the proxy 225 may send a session establishment indication message to the RNC 230 when the signaling for session establishment is eventually undertaken with the transmission of the first RTSP message. The RNC 230 may then respond with another RAB establishment message since the RAB for that session has already been set up. The rest of the actions may then follow the sequence described herein.

From this point on, the RNC 230 may keep track of various parameters and/or calculate other parameters. In one embodiment, the RNC 230 keeps track of the number of IP packets belonging to the streaming media session that are delivered to the client 210. The RNC 230 also keeps track of the corresponding byte count, the number of packets that are discarded at the RNC for repeated block errors over the air interface, and the channel bandwidth that was available to the session (irrespective of whether it was used to carry packets belonging to it.) The RNC 230 processes this information at selected intervals, e.g., every $T_P$=0.100 seconds, to form information that may be sent in a channel/network condition feedback message to the signaling proxy 225. This feedback may include the maximum transmission rate ($W_S$) and, optionally, other relevant performance metrics such as the number of IP packets belonging to the session that are waiting in the RNC buffer, the corresponding byte count, and the like. For example, the RNC 230 may periodically report to the signaling proxy 225 the maximum transmission rate the session can stream at and, possibly, the amount of data stored in the buffer assigned for that session by the RNC 230 and/or other relevant parameters.

In one embodiment, the maximum transmission rate, $W_S$, may be computed as follows. Let $N_D(n)$ denote the number of IP packets delivered to the client 210 during the $n^{th}$ channel condition feedback interval (of length $T_P$ seconds), and let $K_A(n)$ and $K_U(n)$ respectively denote the number of transmission opportunities that were available to the media session and the number of transmission opportunities that were actually used to carry data during the $n^{th}$ interval. With a dedicated channel, a transmission block belonging to the dedicated channel could be looked upon as a transmission opportunity. Let $M_D(n)$ denote the byte count associated with the $N_D(n)$ packets that were actually delivered to the client 210 during this interval. The available bandwidth, $W_A(n)$, is then given by:

$$W_A(n) = M_D(n) * K_A(n) / (K_U(n) * T_P) \text{ (in units of bytes per second)}.$$

The maximum transmission rate for the nth channel/network condition feedback interval, $W_S(n)$, could be set equal to $W_A(n)$, the available bandwidth, or one may use the following heuristic:

$$W_S(n) = \alpha_L * W_A(n) \text{ if } Q(n) < \beta_L,$$
$$= \alpha_H * W_A(n) \text{ if } Q(n) > \beta_H,$$
$$= W_A(n) \text{ otherwise,}$$

where Q(n) is the amount of data belonging to the media session that is queued up in the RNC buffer at the end of the $n^{th}$ channel/network condition feedback interval, $\beta_H$ is some "high watermark," $\beta_L$ is some "low watermark," with $\beta_H > \beta_L$, and $\alpha_L$ and $\alpha_H$ are constants with $\alpha_H$ less than 1 and $\alpha_L$ greater than 1. For instance, with a 20-Kbyte, per-session dedicated RNC buffer, $\beta_H$ and $\beta_L$ might be set equal to 10 Kbytes and 2 Kbytes, respectively, whereas $\alpha_H$ and $\alpha_L$ might be set equal to 0.5 and 1.5 respectively.

In some alternative embodiments, a shared channel may be used to deliver the media stream over the wireless segment. The concept of maximum transmission rate for the media stream can be exploited in these embodiments to maximize the streaming rate without running the risk of packet losses. However, the calculation of the maximum transmission rate for the media stream is different in this case. With a shared channel wherein many different streams/sessions are statistically multiplexed over the same physical or MAC-layer channel. The maximum transmission rate for the media stream is therefore a function of the different streams sharing the channel, their respective priority levels, bandwidth guarantees, channel characteristics, the buffering strategy being used at the RNC, and the buffer levels at the RNC. The specific algorithm for the calculation of the maximum transmission rate is a matter of design choice, although it may depend on the details of the transmission scheduling strategy being used at the base station. The RNC 230 may then inform (via the proxy 225) the media server 215 of the maximum transmission rate at which the media can be streamed, thereby enabling service operators to flexibly share bandwidth resources among different users in accordance with their requirements and service guarantees. This capability may be particularly useful during periods of congestion.

The receiver reports transmitted by the client 210 may be carried in RTCP packets. The GGSN 220 forwards all RTCP packets received in the upstream direction to the signaling proxy 225. When the proxy 225 receives the first such packet for a given session (for which it has made an entry in its local cache), it may append to the packet additional information such as the maximum transmission rate and, possibly, other feedback parameters for the session that it has received from the RNC 230, and forwards the packet toward the server 215. From this point on, the proxy 225 sends an RTCP feedback report to the server 215 at regular intervals. Recall that this interval is typically much shorter (e.g. in order of hundreds of milliseconds to allow both enough averaging and fast feedback—around 100 ms) than the interval at which the client 210 sends its RTCP reports. If the proxy 225 has received a client report (forwarded to it by the GGSN 220) since its last transmission of an RTCP report to the server 215, the proxy 225 may include the data reported by the client 210 as well as the feedback provided by the RNC 230 in its next RTCP report to the server 215. Otherwise, the client 210 includes only the RNC feedback data in its report to the server 215.

Figure 3:
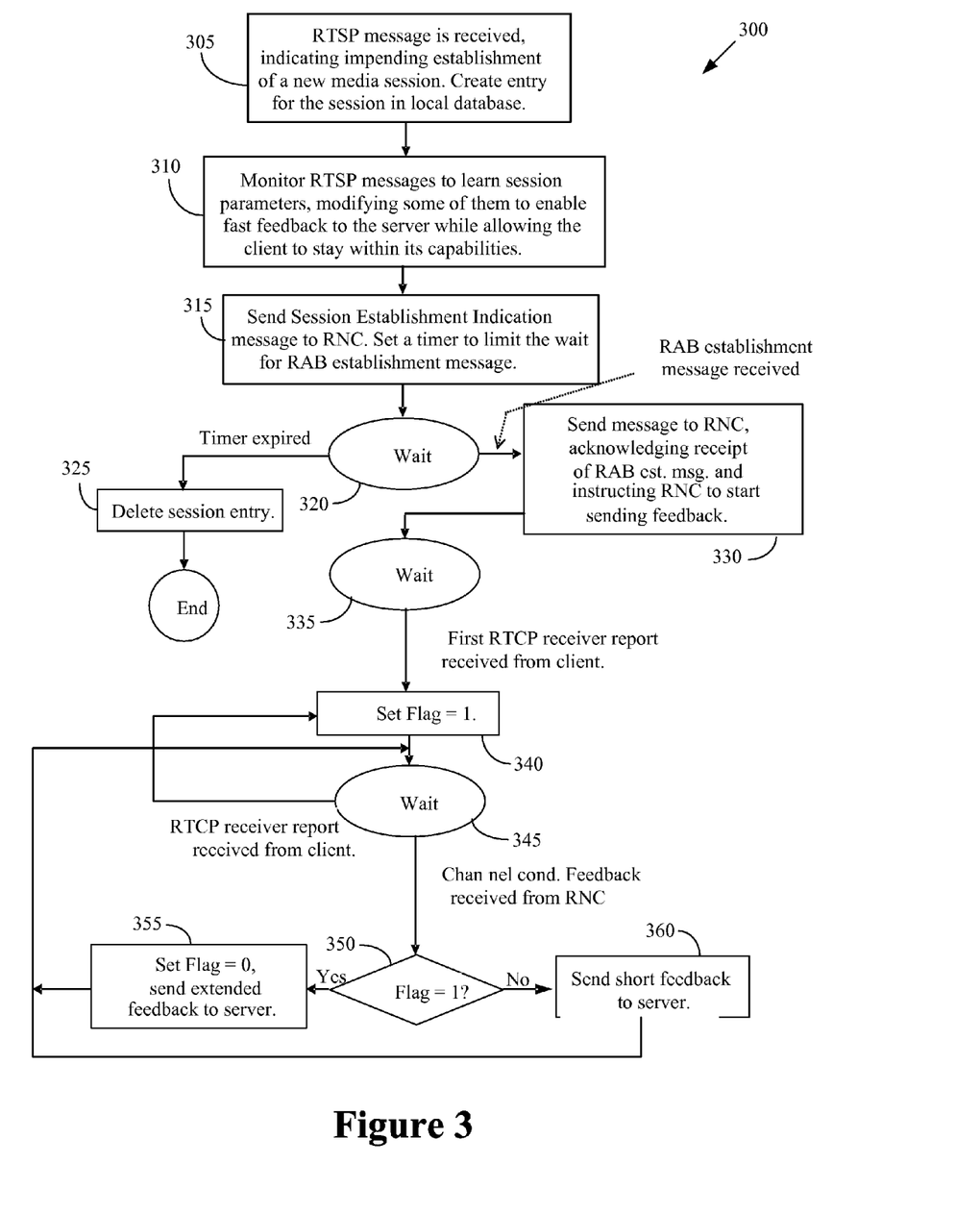
FIG. 3 conceptually illustrates one exemplary embodiment of a method for providing feedback during media streaming over a wireless network, in accordance with the present invention.

FIG. 3 conceptually illustrates one exemplary embodiment of a method 300 for providing feedback during media streaming over a wireless network. As discussed above, a GGSN forwards all RTSP and RTCP messages that it receives from the media server and the client to the signaling proxy. The signaling proxy receives (at 305) these messages and, if the messages indicate impending establishment of a new media session, creates an entry for the new media session in a local database. The signaling proxy may then monitor (at 310) the RTSP messages that are involved in the session's capability exchange phase to learn about session parameters (e.g. client buffer size, time interval at which a client report is sent, etc). When the signaling proxy learns that a media session is about to be established, it sends (at 315) a session establishment indication message to the RNC through which the corresponding media stream is to be delivered. The signaling proxy sets (at 315) a timer after sending this message to the RNC and waits (at 320) for a RAB establishment message (from the RNC) for that media session. If no RAB establishment message is received for the session before the timer expires, the signaling proxy deletes (at 325) the entry for the session from its local database.

If a RAB establishment message for the session is received before the timer expires, the signaling proxy turns off the timer and sends (at 330) a message to the RNC which acknowledges receipt of the RAB establishment message and instructs the RNC to start sending channel/network condition feedback for the corresponding session. This message may contain, among other things, the parameters to be included in the channel/network condition and the interval ($T_P$) at which the feedback is to be provided. After sending this message, the proxy expects to receive a channel/network condition feedback message from the RNC every $T_P$ seconds and an RTCP message (with a receiver report) from the client device every $T_R$ seconds. The proxy therefore waits (at 335) until it receives the first RTCP message with a receiver report from the client. Until the first such report is received, it ignores the channel/network condition feedback messages (for the media session) it may receive from the corresponding RNC. Whenever an RTCP message with a receiver report is received from the client, the proxy sets (at 340) a flag to 1 and then waits (at 345) for receiver reports from the client device and channel/network condition feedback messages from the RNC.

After receiving the first RTCP message with a receiver report, the signaling proxy may carry out the following actions whenever it receives a channel/network condition feedback message for the media session from the corresponding RNC: If the signaling proxy determines (at 350) that the flag has been set to 1, the proxy resets (at 355) the flag (i.e., sets it equal to 0), and sends an extended feedback report to the media server in an RTCP packet. The extended feedback report may include the information reported in the RTCP receiver report received from the client, as well as the maximum transmission rate ($W_S$) at which the corresponding media stream can be transmitted and other optional parameters (if any) reported in the just-received channel/network condition feedback. On the other hand, if the signaling proxy determines (at 350) that the flag equals 0 when the channel/network condition feedback message arrives, the proxy sends (at 360) a short feedback report (also in an RTCP packet), which may include the current values of $W_S$ and other optional parameters (if any) included in the just-received channel/network condition feedback. When the proxy sends an extended feedback report, it may use the RTP timestamp of the most recent RTCP message received from the client as the RTP timestamp of the extended feedback report. In the case of a short report, the proxy may use its local clock-time to generate the RTP timestamp. In one embodiment, the proxy can use the RTP timestamps associated with the RTCP messages received from the client to adjust its clock time to the client's clock time. Note that suitable extensions to the existing RTCP protocol may be developed to enable the transport of the short and extended feedback reports from the proxy.

When the media session is terminated with appropriate RTSP messages from the client or the server, the signaling proxy deletes the entry for that session in its local database, stops sending feedback messages to the media server, and instructs the RNC to stop sending channel/network condition feedback messages.

Embodiments of the techniques described herein may provide a number of advantages over conventional practice. For example, in existing video service setups, the video server estimates the maximum transmission rate using the data provided by the client. This estimation, being indirect, often contains significant errors or may simply be obsolete, especially in dynamic operating conditions such as those typical of wireless networks. On the other hand, the maximum transmission rate determined by the signaling proxy may be more accurate at least in part because it is based on direct measurements. Improving the accuracy of the maximum transmission rate estimation allows the server to transmit data optimally, reducing the likelihood of packet losses in the wireless access network or of underutilizing available resources.

Furthermore, in existing set-ups, because of the limited uplink bandwidth available on the wireless access network, the frequency at which the client sends feedback to the video server is rather low. For instance, in RTP/RTCP-based video streaming sessions, it is typical for the client to send a (feedback) report to the server once every 5 seconds or so. Since there are no such bandwidth limitations between the proxy and the video server, the proxy can send control packets carrying the currently sustainable (i.e., maximum transmission) rate (and, possibly, other useful bits of information) much more frequently, e.g., once every 100 ms or so. This will help the server to modulate the transmit rate optimally, thus fully utilizing the network resources without running the risk of losing packets. The clients can generate their reports at rates consistent with the capability of the wireless access medium. The proxy will use these reports to update its knowledge of the client state. The reports generated by the proxy (at much shorter intervals) and sent to the server will include information derived from the client reports as well as the proxy's estimate of the current value of the maximum transmission rate. Such an arrangement may insure that the client operation is unaffected by the presence of the signaling proxy, so no implementation changes are required on the media client.

Another advantage is that the techniques described herein may allow media servers to use estimated maximum transmission rates that are determined and conveyed to the server by the signaling proxy. In existing set-ups, the media server uses the information received from client reports to obtain an estimate of the current value of the maximum transmission rate. (E.g., via the TCP Friendly Rate Computation algorithm specified in IETF RFC 3448.) Thus, media streaming servers can simply use the periodically-received maximum transmission rate feedback from the proxy in place of the streaming rate values that are computed by the streaming server in accordance with the existing state-of-the-art. The rest of the server functions, in particular the logic for switching to different encoding rates, may remain unchanged. The only capability required at the media server is to be able to operate at a streaming or transmission rate based on maximum transmission rate prediction provided by the proxy. It is expected that this capability will not have any major implication on the server implementation. The existing mechanisms for client feedback (e.g. RTCP receiver reports) can be augmented with simple extensions to carry the maximum transmission rate feedback and other relevant parameters (if they are to be reported) from the proxy.

Yet another advantage of the techniques described herein is that they enable differential treatment to different sessions (streaming as well as other types) based on such parameters as level of congestion and relative priorities, and allow the applications to adapt to the prevailing conditions in a flexible and graceful manner. For instance, if the downlink is congested, the signaling proxy can lower the reported maximum transmission rate for low priority applications, thus forcing the corresponding servers to stream at low rates.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method involving a media server, a wireless access network, at least one media client, and a signaling proxy, comprising:

providing, from the signaling proxy to said at least one media client and at least one radio network controller in the wireless access network, information indicating impending establishment of a media session and a request to receive feedback associated with the media session;

receiving, at the signaling proxy and from said at least one radio network controller, first feedback indicative of resources associated with an air interface between the wireless access network and said at least one media client;

receiving, at the signaling proxy and from said at least one media client, second feedback associated with the media session, wherein the second feedback is transmitted over the air interface and received at a feedback rate; and providing, from the signaling proxy to the media server, at least one report that is formed based on the first feedback and the second feedback, wherein said at least one report is provided at a rate that is higher than the feedback rate.

2. The method of claim 1, comprising accessing at least one Real Time Streaming Protocol message provided by said at least one media client to indicate impending establishment of the media session.

3. The method of claim 1, comprising storing information indicative of the media session between the media server and said at least one media client in a cache associated with the signaling proxy and deleting said information indicative of the media session if no message indicating establishment of a radio access bearer associated with the media session is received within a selected time.

4. The method of claim 3, comprising receiving, at the signaling proxy, information indicating establishment of the radio access bearer associated with the media session.

5. The method of claim 4, comprising providing, in response to the information indicating establishment of the radio access bearer, a positive acknowledgment if the cache includes information indicative of the media session.

6. The method of claim 1, wherein accessing said at least one message comprises determining at least one session parameter associated with the media session based on said at least one message.

7. The method of claim 6, wherein determining said at least one session parameter comprises determining at least one of a bandwidth, a buffer size, and a rate or time interval for transmitting or receiving feedback.

8. The method of claim 7, comprising modifying said at least one session parameter and providing said at least one modified session parameter to at least one of the wireless access network and the media server.

9. The method of claim 1, wherein receiving the first feedback from said at least one radio network controller comprises receiving a maximum transmission rate at which a media stream can be transmitted to said at least one media client under current network conditions.

10. A method, comprising:
generating, at a signaling proxy, a feedback report using media client feedback for a media session between said at least one media client and a media server and network feedback indicative of resources associated with an air interface between the wireless access network and at least one media client, wherein the media client feedback is transmitted from the media client over the air interface at a first feedback rate and the network feedback is provided at a second feedback rate; and
providing, from the signaling proxy, the feedback report to the media server at a third feedback rate that is higher than the first feedback rate.

11. The method of claim 10, wherein generating the feedback report comprises generating the feedback report using network feedback provided by an radio network controller in the wireless access network.

12. The method of claim 10, wherein generating the feedback report comprises generating the feedback report using network feedback provided by at least one of a radio network controller or a base station router associated with said at least one media client.

13. The method of claim 10, wherein generating the feedback report comprises generating the feedback report using network feedback comprising information indicating at least one of a buffer level in the wireless access network, a number of users sharing downlink bandwidth with said at least one media client, or a bandwidth available to each user.

14. The method of claim 10, wherein generating the feedback report comprises generating the feedback report based on network feedback comprising information indicating a maximum transmission rate at which a media stream can be transmitted to said at least one media client under the current conditions.

15. The method of claim 10, comprising receiving a media session establishment request from said at least one media client at the signaling proxy and performing a capability exchange in which the signaling proxy determines at least one session parameter negotiated by the media client and the media server for the requested media session.

16. The method of claim 10, comprising modifying a feedback rate indicated in the media session establishment request and providing a modified media session establishment request comprising the modified feedback rate from the signaling proxy to the media server.

17. The method of claim 16, wherein modifying the feedback rate indicated in the media session establishment request comprises increasing the feedback rate indicated in the media session establishment request so that the media server is prepared to receive feedback from the signaling proxy at the increased feedback rate.

18. The method of claim 1, wherein receiving the second feedback comprises receiving at least one Real Time Control Protocol (RTCP) packet transmitted over the air interface at the feedback rate.

19. The method of claim 18, wherein receiving said at least one RTCP packet comprises receiving at least one RTCP packet comprising at least one performance metric associated with the media session.

20. The method of claim 19, wherein said at least one performance metric comprises at least one of a fraction of packets lost since transmission of a previous RTCP packet, a cumulative number of packets lost, a highest sequence number received, a timestamp associated with a previous report received from the media server, a time since receiving the previous report, a sequence number associated with a next application data unit to be decoded, a delay until decoding of the next application data unit, or free buffer space at the media client.

* * * * *